United States Patent [19]

Sauvion et al.

[11] Patent Number: 4,940,685
[45] Date of Patent: Jul. 10, 1990

[54] CERIC OXIDE PARTICULATES HAVING A STABLE SPECIFIC SURFACE AND A PROCESS FOR THEIR PREPARATION

[75] Inventors: Guy-Noel Sauvion, Chevilly-Larue; Jack Caillod, Taverny; Claire Gourlaouen, Paris, all of France

[73] Assignee: Rhone-Poulenc Specialites Chimique, Courbevoie, France

[21] Appl. No.: 881,665

[22] Filed: Jul. 3, 1986

[30] Foreign Application Priority Data

Jul. 3, 1985 [FR] France .................. 85 10137

[51] Int. Cl.$^5$ .................. B01J 21/06; B01J 23/10; B01J 32/00
[52] U.S. Cl. .................. 502/263; 502/304; 502/439
[58] Field of Search .................. 502/263, 304, 439

[56] References Cited

U.S. PATENT DOCUMENTS

| | | | |
|---|---|---|---|
| 3,752,774 | 8/1973 | Stiles | 502/304 |
| 3,830,756 | 8/1974 | Sanchez et al. | 502/304 |
| 4,062,810 | 12/1977 | Vogt et al. | 252/462 |
| 4,231,893 | 11/1980 | Woodhead | 502/304 X |
| 4,490,567 | 12/1984 | Drake | 585/324 |
| 4,510,267 | 4/1985 | Pierantozzi | 502/304 X |
| 4,581,343 | 4/1986 | Blanchard et al. | 502/304 X |
| 4,585,752 | 4/1986 | Ernest | 502/304 |
| 4,606,847 | 8/1986 | Woodhead | 252/363.5 |
| 4,663,137 | 5/1987 | Chane-Ching et al. | 502/304 X |

FOREIGN PATENT DOCUMENTS

| | | |
|---|---|---|
| 56-26547 | 5/1981 | Japan . |
| 57-63133 | 7/1982 | Japan . |
| 58-114730 | 9/1983 | Japan . |

OTHER PUBLICATIONS

Zeitschrift für Anorganische und Allgemeine Chemie, vol. 315, Nos. 3-4, Jun. 1962, pp. 121-135; Rienäcker et al.

*Primary Examiner*—W. J. Shine
*Attorney, Agent, or Firm*—Burns, Doane, Swecker & Mathis

[57] ABSTRACT

A ceric oxide composition, the specific surface of which remains essentially stable at elevated temperatures and which is thus well adopted for purposes of catalysis, is comprised of a plurality of solid, porous, finely divided ceric oxide particulates, said ceric oxide particulates advantageously having an effective amount of at least one oxide of another metallic element A intimately dispersed therein as to essentially prevent the coalescence of the micropores thereof.

27 Claims, No Drawings

CERIC OXIDE PARTICULATES HAVING A STABLE SPECIFIC SURFACE AND A PROCESS FOR THEIR PREPARATION

BACKGROUND OF THE INVENTION

1. Field of the Invention

The present invention relates to novel ceric oxide compositions, and, more especially, to novel ceric oxide particulates, the specific surface of which is stabilized, even at elevated temperatures This invention also relates to the preparation of such particulates and the use thereof, notably in the field of catalysis.

As utilized herein, by the term "specific surface" is intended the B.E.T. specific surface determined by the BRUNAUER-EMMETT-TELLER method, described in *J.A.C.S.*, 60, 309 (1938).

2. Description of the Prior Art:

It is known to this art that ceric oxide may be used both as a catalyst and as a catalyst support. Compare, for example, the publication by Paul Meriaudeau and colleagues relative to the synthesis of methanol from $CO + H_2$ on platinum catalysts deposited onto ceric oxide; C. R. Acad. Sc. Paris, t. 297 —Serie II-471 (1983).

It is also known to this art that the efficacy of a catalyst generally increases with the area of the contact surface between the catalyst and the reagents. For this, it is necessary to maintain the catalyst in the most highly divided state possible, i.e., the solid particles of which should be as small and as separate as possible. The fundamental role of the support, therefore, is to maintain the particles or crystallites of the catalyst in contact with the reagents in the most highly divided state possible.

Upon extended use of a catalyst support, the specific surface decreases due to the coalescence of the very fine micropores. Over the course of this coalescence, a portion of the catalyst becomes incorporated in the support mass and is prevented from contacting the reagents.

Heretofore, most of the ceric oxides prepared had a specific surface which decreased rapidly at operating temperatures higher than 500 C. Thus, R. Alvero et al., *J. Chem. Soc. Dalton Trans.*, 87, (1984) obtained, from ammonium nitrato cerate, a ceric oxide having, after calcination at 600° C., a specific surface of 29 $m^2/g$.

In the Meriaudeau et al publication, supra, for the same type of preparation, a specific surface of 27 $m^2/g$ was determined.

SUMMARY OF THE INVENTION

A major object of the present invention is the provision of novel compositions based on ceric oxide which have stable specific surfaces, even at elevated temperatures, and which are comprised of ceric oxide alone, or ceric oxide in combination with an oxide of another metallic element A, i.e., aluminum, silicon, zirconium, thorium and the rare earth metals.

DETAILED DESCRIPTION OF THE PREFERRED EMBODIMENTS OF THE INVENTION

More particularly according to the present invention, the starting material ceric oxide, per se, is known to this art and is described in the literature.

It may be prepared, in particular, by heating (in air at a temperature of from 400° C. to 1000° C.) ceric hydroxide or certain oxy salts of cerium, such as the nitrates, sulfates, carbonates, oxalates, acetates, etc. See Paul Pascal, *New Treatise on Inorganic Chemistry*, Vol. VII, p. 777 (1959).

The ceric oxide used has a specific surface of at least 10 $m^2/g$, preferably at least 80 $m^2/g$ and advantageously ranging from 80 to 200 $m^2/g$.

The starting material of choice is the ceric oxide described in published French Application No. 86/04347, having a specific surface that may reach 180 to 160 $m^2/g$, measured after calcination at a temperature of from 400° to 450° C., said oxide being prepared as described below by the calcination of an aqueous colloidal dispersion of a cerium (IV) compound which has previously been destabilized by the addition of a base.

It may be advantageous for certain applications to shape it by agglomerating the particles thereof by well known methods of extrusion or pelleting under pressure.

The composition of the invention may contain, in addition to the ceric oxide, an oxide of the aforenoted metal or metals A in an amount representing 1 to 20% by weight of the ceric oxide, and preferably from 1 to 5% thereof.

It may be prepared by a process which includes intimately admixing the ceric oxide with at least one oxide of such other metals.

This intimate mixture is preferably carried out by impregnation of the ceric oxide with a solution of at least one salt of the metals A that may be decomposed into the oxide upon heating, hereinafter referred to as the "precursor" oxide.

Exemplary of the aluminum oxide precursors, the nitrates and the sulfates are representative.

Exemplary of the silicon dioxide precursors, the quaternary ammonium silicates are the preferred.

The quaternary ammonium ion of the silicates according to the invention advantageously comprises hydrocarbon radicals preferably having 1 to 3 carbon atoms.

It is preferred to use at least one silicate selected from among: tetramethylammonium silicate, tetrapropylammonium silicate, tetrahydroxyethylammonium silicate (or tetraethanolammonium silicate). Tetramethylammonium silicate is described in particular in Y.U.I. Smolin, "Structure of water soluble silicates with complex cations" in *Soluble Silicates*, 1982 Edition. Tetraethanolammonium silicate is described in particular in H. H. Weldes and K. R. Lange, "Properties of soluble silicates" in *Industrial and Engineering Chemistry*, Vol. 61, N 4 (April 1969) and in U.S. Pat. No. 3,239,521. These references also describe other water soluble quaternary ammonium silicates within the ambit of the invention.

Exemplary of the zirconium oxide precursors, representative are zirconium sulfate, zirconyl nitrate, optionally fluorine compounds of zirconium such as a zirconium fluoride complex, and any other compound capable of yielding zirconium oxides after calcination, in the form of zirconia or baddeleyite As regards the rare earths, representative are, for example, yttrium nitrates, chlorides, sulfates, or the lanthanides, such as lanthanum, praseodymium, neodymium, samarium, europium, gadolinium, terbium, dysprosium, holmium, erbium, thulium, ytterbium, lutecium. Among the lanthanides, lanthanum, neodymium and praseodymium are the preferred.

In a preferred embodiment of the invention, the impregnation is carried out "dry", i.e., such that the total volume of the impregnating solution is approximately equal to the total pore volume provided by the support. To determine the pore volume, the mercury porosimeter method may be used, or the amount of water absorbed by immersing it in the solution of the oxide precursor of element A and eliminating the excess liquid by draining.

The concentration of the oxide precursor depends upon the solubility of said precursor.

In the second stage of the process of the invention, the impregnated ceric oxide is dried to eliminate the water, while leaving the precursors of the desired oxides in dispersed form within the ceric oxide.

Drying is effected most typically in air at a temperature that may vary from 80° to 300° C. and preferably from 100° to 150° C. Drying is continued until a constant weight is obtained.

Generally, the drying period ranges from 1 to 24 hours.

In the third stage of the process of the invention, the impregnated ceric oxide is calcined at a temperature generally from 400° to 1000° C. and preferably from 600° to 900° C. The duration of the calcination must be sufficient to convert the precursors into their corresponding oxides.

The calcining period may vary over wide limits, from 1 to 24 hours and preferably from 4 to 10 hours.

The compositions based on ceric oxide prepared according to the invention exhibit stabilized specific surfaces at elevated temperatures, as demonstrated by the examples presented below.

In another embodiment of the invention, the metallic element A is introduced in the form of an oxide precursor during the production of the ceric oxide.

This embodiment features preparing the composition of the invention by a process which comprises:

(i) in a first stage, introducing at least one oxide precursor of a metallic element A into an aqueous colloidal dispersion of a compound of cerium (IV);

(ii) in a second stage, destabilizing said dispersion by the addition of a base thereto;

(iii) in a third stage, separating the precipitate which results; and (iv) in a fourth stage, subjecting it to a heat treatment.

In the first stage of the process according to the invention, any aqueous colloidal dispersion of a cerium (IV) compound, and particularly those described in French Application No. 86/04347 which enable the production of ceric oxides having large specific surfaces, may be used.

The aqueous colloidal dispersions of a cerium (IV) compound described in French Application No. 86/04347 are obtained by the dispersion in water of a compound of cerium (IV) having the following general formula (I):

$$Ce\,(M)_x\,(OH)_y\,(NO_3)_z \cdot n\,H_2O \qquad (I)$$

wherein M is an alkali metal or a quaternary ammonium radical; x ranges from 0 to 0.2; z ranges from 0 to 0.7; y is such that $y = 4 - z + x$; and D ranges from 0 to about 20.

The term "sol" as utilized herein is intended to designate the aqueous colloidal dispersion of a compound of cerium (IV) having the Formula (I).

The concentration of the cerium (IV) compound in the sol is not critical. When expressed as $CeO_2$, it ranges from 0.1 to 2.0 moles/liter and preferably from 0.5 to 1 mole/liter.

The proportion of cerium (IV) in the colloidal form is higher than 95%, but the invention does not exclude the presence of cerium (IV) in the sol in the ionic form. Preferably, the amount of cerium (IV) in colloidal form ranges from 99 to 100%.

The size of the colloids present in the sol may vary over a rather wide range. Generally, the average hydrodynamic diameter of the colloids, determined by the quasielastic diffusion of light according to the method described by M. L. McConnell in *Analytical Chemistry*, 53, No. 8, 1007A (1981), may range from 300 to 2000 Å.

Exemplary of those sols having the aforesaid characteristics, representative are, in particular, those described in French Application No. 86/04347 prepared by the dispersion, in water, of a cerium (IV) compound having the Formula (I) wherein x is equal to 0 and z ranges from 0.35 to 0.7, with the colloid size of said sols varying over a rather wide range of from 300 to 1000 Å and which may become coarser after basification to a pH of 3.0, their hydrodynamic diameter then ranging from 500 to 2000 Å.

The sols having the aforementioned colloidal sizes are obtained by dispersing in water said cerium (IV) compound, which is directly dispersible in water. Said compound is dispersed under agitation in an aqueous or slightly acid medium such that the product sol has a pH of from 1 to 2.5.

The cerium (IV) compound is prepared by, in a first stage, hydrolyzing an aqueous solution of a cerium (IV) salt in an acid medium; in a second stage, separating the resulting precipitate; and, in a third stage, which is not compulsory, of heat treating same.

In the first stage, the hydrolysis of an aqueous solution of a cerium (IV) salt is carried out.

For this purpose, a solution of cerium (IV) is selected which may be an aqueous solution of ceric nitrate. This solution may contain, without disadvantage, cerium in the cerous state, but it is desirable that it contain at least 85% cerium (IV) in order to provide good yields.

The solution of the cerium salt is selected such that it does not contain impurities which may be transferred into the final product. It may be advantageous to use a solution of a cerium salt having a purity greater than 99%.

The concentration of the cerium salt solution is not critical according to the invention. If expressed as cerium (IV), it may vary from 0.3 to 3 moles per liter, and preferably from 0.5 to 1.5 moles/liter.

As starting materials, a ceric nitrate solution can be used, obtained by the action of nitric acid on a hydrated ceric oxide prepared by conventional method, by the reaction of a cerous salt, for example, cerous carbonate, with an ammonia solution in the presence of hydrogen peroxide.

The solution of ceric nitrate obtained via the electrolytic oxidation of cerous nitrate solution, and described in French Pat. No. 2,570,087, is the starting material of first choice.

The hydrolysis medium consists of water, the nature of which is not critical and which preferably is distilled or permutated water.

Acidification may be carried out by the addition of a mineral acid. Preferably, nitric acid is selected. The acid may be concentrated or dilute, for example, to $10^{-2}$ N.

It may also originate from the solution of ceric nitrate which may be slightly acidic and may have a normality of from 0.01 N to 5 N, preferably from 0.1 N to 1 N.

The amount of H+ions introduced by the hydrolysis reaction is such that the molar ratio $[H^+]/[Ce^{IV} eq.]$ is greater than or equal to 0 and less than or equal to 3, preferably ranging from 0.4 to 2.5.

The proportion of the aqueous solution of the cerium (IV) salt to the hydrolysis medium (essentially water) is such that the final equivalent cerium (IV) concentration ranges from 0.1 to 1.0 mole/liter and preferably from 0.2 to 0.6 mole/liter.

The final equivalent cerium (IV) concentration is defined by the following equation:

$$[Ce^{IV} eq.] = ([Ce^{IV}] \times V')/(V + V')$$

wherein:

[CeIV] is the concentration in moles/liter of the solution of the cerium IV salt;

V is the volume of water, with the optionally added acid; and

V' is the volume of the cerium (IV) solution.

The hydrolysis of the cerium (IV) salt is carried out under those conditions described above, preferably between 70° C. and 120° C. and at the reflux temperature of the reaction medium, which is about 100° C.

It is easier to operate at the reflux temperature, which is readily controlled and reproduced.

The process for the preparation of the cerium (IV) compound may be carried out according to any one of a number of variants. For example, the solution of the cerium (IV) salt may be added all at once, gradually or continuously to the water optionally containing the acid, and heated to the reaction temperature, or vice versa. It is also possible to effect the process continuously. For this purpose, the mixture of the solution of the cerium (IV) salt with the hydrolysis medium is carried out simultaneously and continuously, and the mixture is heated continuously to the reaction temperature selected.

It is possible to mix together the solution of the cerium (IV) salt and the hydrolysis medium, and then heat said mixture under agitation to the reaction temperature.

Regardless of the particular technique selected, the formation of a precipitate is observed. The reaction time may vary from 2 to 8 hours, preferably from 3 to 6 hours.

In the following stage, the reaction mass present in the form of a suspension, at a temperature most typically ranging from 90° to 100° C., is separated by conventional methods. This operation is carried out before or after cooling the reaction mass to ambient temperature, i.e., typically from 10° to 25° C.

The precipitate is separated by conventional separation methods: filtration, decantation, drying and centrifuging.

A precipitate of a compound of cerium (IV) corresponding to Formula (I) is obtained, wherein n is larger than 0 and less than or equal to approximately 20. This compound may be directly dispersed in water.

It is also possible to subject the precipitate obtained to a drying operation which, as a function of the conditions and in particular of the duration of the drying and of its temperature, enables production of a cerium (IV) compound of Formula (I) in which n is greater than or equal to 0 and less than 20.

The product obtained is subjected to drying which may vary from 15° to 100° C. and preferably from ambient temperature to 50° C. This operation may be carried out in air or under a reduced pressure of from 1 to 100 mm mercury (133.3322 Pa to 13,332.2 Pa). The duration of the drying preferably ranges from 5 to 48 hours in order to obtain a dry product (n=0).

Regardless of the degree of dehydration of the cerium (IV) compound corresponding to the Formula (I), a compound of cerium (IV) is obtained which may be dispersed directly in water and which, by means of the dispersion thereof in water, gives rise to a sol having colloidal particles with a hydrodynamic diameter ranging from 300 to 1000 Å.

As further examples of sols suitable for use in the process of the invention, sols may be used which typically have an average hydrodynamic diameter of from 300 to 600 Å and which are prepared by forming a dispersion of hydrated ceric oxide with water and an acid, in particular nitric acid, and heating the suspension, with the amount of acid present in the dispersion being such that the pH is less than 5.4 and preferably less than 2.8. The beginning hydrated ceric oxide is prepared by reaction of a solution of a cerous salt, for example, cerous carbonate, and an ammonia solution, in the presence of an oxidizing agent, in particular hydrogen peroxide. For additional details concerning the preparation of the sol, see French Pat. No. 2,416,867.

In the first stage of the process of the invention, at least one precursor of the oxide of element A is introduced into an aqueous colloidal dispersion of a cerium (IV) compound described above.

The precursors of the oxides of aluminum, silicon, zirconium, thorium and the rare earth metals suitable for use are those described above.

They may be used in the form of an aqueous solution, or optionally in solid form, if it exists directly in the aqueous colloidal dispersion of the cerium (IV) compound.

The amount of the precursor or precursors of the oxide or oxides employed is such that the weight percentages defined by the final composition are obtained.

The second stage of the process of the invention includes destabilizing the aqueous colloidal dispersion of a cerium (IV) compound containing at least one oxide precursor of element A by the addition of a base to said dispersion.

The basic solution used in the process of the invention may be, in particular, an aqueous solution of ammonium, sodium or potassium hydroxide. Gaseous ammonia may also be used. According to the invention, an ammonium solution is preferably used.

The normality of the basic solution is not critical according to the invention; it may vary over wide limits, for example, from 0.1 to 11 N, but it is preferable to use a solution having a concentration of from 5 to 10 N.

The amount of the base added is determined such that the final pH of the dispersion treated is greater than 7 and preferably greater than or equal to 9 and less than or equal to 10.

As a practical manner, the base is added to the aqueous colloidal dispersion of the cerium (IV) compound containing at least one oxide precursor of element A, or vice versa. The addition may be carried out all at once, gradually or continuously. It is conducted under agitation.

Preferably, the base is added to said dispersion.

The rate of flow of the addition of the base to said dispersion is not critical; when expressed in moles of OH⁻ per mole of cerium (IV) and per hour, it may range from 0.1 to 5 and preferably from 2 to 4.

The mixture is carried out at a temperature that is preferably less than 60.C and more preferably at ambient temperature which typically ranges from 10° to 25° C.

Upon completion of the addition of the basic solution, the reaction medium may be maintained optionally under agitation for a certain time to complete the precipitation; this time period is not critical and may range from 1 min to 24 hours.

The third stage of the process includes the separation of the precipitate obtained by conventional solid/liquid separation methods: filtration, decantation, centrifuging or draining.

This separation is usually carried out at ambient temperature.

The separated precipitate may optionally be subjected to a washing operation to eliminate the OH⁻ ions.

The washing may be carried out with water or with an organic solvent. Aliphatic, cycloaliphatic or aromatic hydrocarbons, aliphatic or cycloaliphatic ketones or aliphatic or cycloaliphatic alcohols, such as methanol, ethanol, n-propanol, isopropanol, n-butanol, isobutanol, neobutanol, may be used.

One or several washings, most frequently one to three washings, are typical.

After washing, the water content of the precipitate ranges from 20 to 80% and generally from 20 to 50%.

In the fourth stage of the process of the invention, the heat treatment of the product obtained after separation and optional washing is carried out.

The heat treatment generally begins with drying in air, or under a reduced pressure on the order of 1 to 100 mm mercury (133.3322 Pa and 13,332.2 Pa). The drying temperature may vary from ambient temperature to 100° C. and its duration is not critical; it may range from 2 to 48 hours and preferably from 10 to 24 hours.

Finally, in a last operation the dried product is calcined at a temperature of from 400° C. to 1000° C., preferably from 600° to 900° C. The duration of this step is from 1 to 24 hours and preferably from 4 to 10 hours.

The temperature of calcination is determined as a function of the specific surface desired for the subsequent catalytic application, by taking into account the fact that the specific surface is an inverse function of the calcination temperature.

The presence of the metallic element A introduced into the ceric oxide according hereto also makes possible, as demonstrated in the examples to follow, to attain an improved stability of the ceric oxide when exposed to elevated temperatures. The composition thus obtained comprises a plurality of solid, porous, freely divided ceric oxide particulates having dispersed therein the metallic element A, the latter preventing the coalescense of micropores in the particulates.

The ultimate uses of the subject compositions based on ceric oxide are very numerous. In particular, applications as fillers, binders, washcoat, thickeners, dispersants, reinforcers, pigments and absorbants, are illustrative.

The stabilized ceric oxide according to the invention is well adapted for use in the field of catalysts, as a catalyst or as a catalyst support.

It may be employed as a catalyst or catalyst support in carrying out various reactions, such as, for example, dehydration, hydrosulfuration, hydrodenitrification, desulfuration, hydrodesulfuration, dehydrohalogenation, vapor reforming, cracking, hydrocracking, hydrogenation, dehydrogenation, isomerization, dismutation, oxychlorination, the dehydrocyclization of hydrocarbons or other organic compounds, oxidation and/or reduction reactions, the Claus reaction, the treatment of the exhaust gases from internal combustion engines, demetallization, methanation, shift conversion, etc.

In order to further illustrate the present invention and the advantages thereof, the following specific examples are given, it being understood that same are intended only as illustrative and in nowise limitative. In said examples to follow, the metallic elements A were determined by plasma emission spectrometry.

EXAMPLE 1

In this example, a ceric oxide containing 2.5% $SiO_2$ was prepared.

The starting material ceric oxide was produced in the following manner:

400 g hydrated cerous nitrate, $Ce(NO_3)_3.6H_2O$, were dissolved in 200 cm³ water and the solution was evaporated at 140° C. for 4 hours. The product obtained was progressively dried in air at 400° C. employing a temperature rise of 1° C./min.

A calcination in air was carried out at 400° C. for 6 hours and a ceric oxide was obtained, the X-ray diffraction analysis of which evidenced that it conformed to that of pure ceric oxide (JCPDS 40593).

Subsequently, 153 g of the ceric oxide shaped by extrusion (with the addition of 20% water) into granules, having the dimensions of 2×3 mm, were impregnated in a rotating coating machine with 32 cm³ of an aqueous solution of tetraethylammonium silicate having a molar ratio of $SiO_2(C_2H_5)_4N^+$ equal to 1 and containing 116 g $SiO_2$ per liter of solution.

The impregnated ceric oxide was then dried at 140° C. for 16 hours and then calcined for 6 hours at different temperatures: 400° C., 550° C., 700° C. and 900° C.

Following calcination, the specific surface of the product, which had been comminuted by grinding, was measured by the B.E.T. method.

The results obtained are reported in Table I. As a comparison, measurements of the specific surface of unstabilized ceric oxide are also reported (Experiment A).

TABLE I

|  | Additive | 400° C. | 550° C. | 700° C. | 900° C. |
| --- | --- | --- | --- | --- | --- |
| Example 1 | $SiO_2$ | 80 | 70 | 60 | 20 |
| Exp. A. | — | 70 | 50 | 30 | 5 |

Table I clearly demonstrates that better stabilization of the specific surface of the ceric oxide is obtained if silica is added.

EXAMPLE 2

A ceric oxide containing 2.5% $ZrO_2$ was prepared according to the procedure of Example 1, but by carrying out the impregnation with 32 cm³ of a solution of zirconyl nitrate containing 116 g/l zirconium oxide.

The BET specific surfaces measured after calcination are reported in Table II.

TABLE II

| | Additive | 400° C. | 550° C. | 700° C. | 900° C. |
|---|---|---|---|---|---|
| Example 2 | $ZrO_2$ | 75 | 70 | 50 | 10 |
| Exp. A | — | 70 | 50 | 30 | 5 |

EXAMPLE 3

In this example, a ceric oxide containing 2.5% $La_2O_3$ was prepared.

An intimate admixture of 153 g ceric oxide with 32 cm³ of a lanthanum nitrate solution containing 116 g/l lanthanum oxide was prepared.

The product obtained was dried and calcined according to the procedure of Example 3.

The results obtained are reported in Table III.

TABLE III

| | Additive | 400° C. | 550° C. | 700° C. | 900° C. |
|---|---|---|---|---|---|
| Example 1 | $La_2O_3$ | 75 | 70 | 50 | 10 |
| Exp. A | — | 70 | 50 | 30 | 5 |

EXAMPLE 4

A ceric oxide containing 2 5% $Al_2O_3$ was prepred.

Following the procedure of Example 1, 153 g ceric oxide were impregnated twice with 64 cm3 of an aluminum nitrate solution containing 58 g/l $Al_2O_3$.

The impregnated ceric oxide was dried and calcined as described above.

The results obtained are reported in Table IV.

TABLE IV

| | Additive | 400° C. | 550° C. | 700° C. | 900° C. |
|---|---|---|---|---|---|
| Example 4 | $Al_2O_3$ | 80 | 70 | 45 | 10 |
| Exp. A | — | 70 | 50 | 30 | 5 |

Table IV demonstrates the effect of stabilization of the specific surface at high temperature, by the addition of aluminum oxide to the ceric oxide.

EXAMPLE 5

In this example, the effect of stabilization of the specific surface of a ceric oxide having a large specific surface area by the addition of 2.5% $SiO_2$ is demonstrated.

(1) The ceric oxide used was prepared as described in published French Application No. 86/04347 and according to the following procedure:

Into a reactor equipped with a thermometer, an agitator device, a system for the introduction of the reagents, a reflux condenser and a heating device, at ambient temperature, 2.455 liter of 0.59 N nitric acid were introduced.

The temperature of this solution was increased to 100° C. under agitation and 545 cm³ of a ceric nitrate solution, prepared as in French Pat. No. 2,570,087 and containing 1.28 moles/liter cerium (IV), 0.06 mole/liter cerium (III) and having a free acidity of 0.53 N, were added over 3 hours.

The reaction medium was maintained under agitation and at reflux for 3 hours.

Filtration was effected on sintered glass (No. 3 porosity).

The product obtained was dried in an oven at 40° C. for 48 hours. 133.6 g were collected.

25.9 g of the compound prepared in this manner were added to distilled water used in an amount sufficient to provide a volume of 250 cm³ A sol having a $Ce^{IV}$ concentration, expressed as $CeO_2$, of 86 g/l (0.5 M) and containing colloids having an average hydrodynamic diameter on the order of 570 Å, was obtained.

To 250 cm³ of the sol prepared in this manner, under agitation and at ambient temperature, an 11 N ammonia solution was added to adjust the pH to 10, at a rate of 22.5 cm³/hr.

The reaction mass was maintained at pH = 10 for 5 min; then a solid/liquid separation was carried out by filtration.

After filtering, the collected solids were dried in an oven at 100° C. for 24 hours.

Calcination was then carried out in a muffle furnace for 6 hours at 450° C.

A ceric oxide having a specific surface of 107 m²/g was obtained.

(2) The ceric oxide prepared as above was impregnated by immersion in a solution of an oxide precursor, i.e., a solution of tetraethylammonium containing 250 g/l $SiO_2$.

The excess solution was eliminated by draining.

The impregnated ceric oxide was dried at 140° C. for 16 hours and then calcined for 6 hours at different temperatures: 450° C., 550° C., 700° C. and 900° C.

The results obtained are reported in Table V.

As a comparison, the measurements of the specific surface of an unstabilized ceric oxide are also reported (Experiment B).

TABLE V

| | Additive | 450° C. | 550° C. | 700° C. | 900° C. |
|---|---|---|---|---|---|
| Exp. B | | 107 | 79 | 35 | 5 |
| Example 5 | $SiO_2$ | 101 | 84 | 57 | 17 |

EXAMPLE 6

A different embodiment for the introduction of the metallic element A is illustrated in this example.

(a) Preparation of a sol of a cerium (IV) compound:

Into a reactor equipped with a thermometer, an agitator, a system for the introduction of the reagents, a reflux condenser and a heating device, the following materials were introduced at ambient temperature:

(i) 2150 cm³ of a 1.02 N nitric acid solution;

(ii) 850 cm³ of a solution of ceric acid prepared by electrolysis according to French Pat. No. 2,570,087 and containing 1.23 moles/liter cerium (IV), 0.05 mole/liter cerium (III) and having a free acidity of 0.49 N.

In the hydrolysis medium, the concentration in cerium (IV), expressed as CeO2, was equal to 60 g/l and the molar ratio $[H+]/[Ce^{IV} eq.]$ was equal to 2.5.

The reaction medium was maintained under agitation and under reflux for 4 hours.

Filtration was carried out on sintered glass (No. 3 porosity).

The product obtained was dried in an oven at 40° C. for 48 hours.

59.4 g of a yellow precipitate containing 83% $CeO_2$ and corresponding to Formula (I), wherein x is equal to 0 and the molar ratio $[NO^-_3]/[Ce_{Iv}]$ was approximately 0.5, were obtained.

25.9 g of the compound prepared in this manner were added to distilled water in an amount sufficient to provide a volume of 250 cm³ A sol having a concentration in $Ce^{IV}$, expressed as $CeO_2$, of 86 g/l (0.5 M) was obtained.

Examination by quasielastic diffusion of light evidenced the presence of colloids having an average hydrodynamic diameter on the order of 310 Å.

(b) Preparation of a composition containing 2.5% $SiO_2$ expressed with respect to the weight of ceric oxide:

Into 500 cm³ of a sol of 0.5 mole/liter $CeO_2$ prepared as described in (a), 13 cm³ of a solution of tetraethylammonium silicate containing 82 g/l of $SiO_2$ were introduced and then a 5 N ammonia solution was added to the resulting medium, under agitation and at ambient temperature, until a pH of 9 was attained, at a rate of 200 cm³/hr.

The reaction mass was maintained at pH =9 for 5 min, followed by solid/liquid separation by filtering.

The precipitate collected was then washed in 500 cm3 distilled water for 15 min.

After filtration, the collected solids were dried in an oven at 100° C. for 20 hours.

They were then calcined for 6 hours at different temperatures: 300° C., 450° C., 600° C., 800° C.

The results obtained are reported in Table VI. As a comparison, measurements of the specific surface obtained by the destabilization and calcination of the sol obtained according to step (a), but without the addition of the solution of the oxide precursor, are included (Experiment C).

TABLE VI

|  | Additive | 300° C. | 450° C. | 600° C. | 800° C. |
|---|---|---|---|---|---|
| Example 6 | $SiO_2$ | 135 | 120 | 59 | 36 |
| Exp. C. | — | 144 | 115 | 42 | 10 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A ceric oxide-based composition, the specific surface of which remains essentially stable at elevated temperatures, which composition includes a carrier comprising a plurality of solid, porous, finely divided ceric oxide particulates, said ceric oxide particulates of said carrier having intimately dispersed therein an effective amount of at least one oxide of a metallic element A comprising silicon, zirconium, or thorium, said ceric oxide particulates having been shaped and calcined;

wherein the amount of the at least one oxide of said metallic element A comprises from about 1 to about 20% by weight of said ceric oxide particulates and wherein the specific surface area of said composition is greater than the specific surface area of said ceric oxide particulates without said metallic element A.

2. The composition as defined by claim 1, wherein the amount of the at least one oxide of said metallic element A comprises from 1 to 5% by weight of said ceric oxide particulates.

3. The composition as defined by claim 1, comprising an agglomeration of said ceric oxide particulates.

4. A process for the preparation of the composition as defined by claim 1, comprising intimately dispersing the at least one oxide of said metallic element A within the pore volume of said ceric oxide particulates.

5. The process as defined by claim 4, comprising impregnating said ceric oxide particulates with a solution of a precursor of said at least one metal A oxide, and converting said precursor into the oxide form thereof.

6. The process as defined by claim 5, comprising dry impregnating said ceric oxide particulates.

7. The process as defined by claim 5, said precursor comprising zirconyl sulfate, zirconyl nitrate, or a zirconium/fluorine complex.

8. The process as defined by claim 5, comprising drying said impregnated ceric oxide particulates at a temperature of from 80° to 300° C.

9. The process as defined by claim 5, comprising drying said impregnated ceric oxide particulates at a temperature of from 100° to 150° C.

10. The process as defined by claim 8, wherein said drying is carried out for from 1 to 24 hours.

11. The process as defined by claim 8, comprising calcining said dried ceric oxide particulates at a temperature of from 400° to 1000° C.

12. The process as defined by claim 8, said temperature of calcination ranging from 600° to 900° C.

13. The process as defined by claim 8, wherein said calcination is carried out for from 1 to 24 hours.

14. The process as defined by claim 13, wherein said calcination is carried out for from 4 to 10 hours.

15. A process for the preparation of the composition as defined by claim 1, comprising (i) introducing a precursor of said at least one metal A oxide into an aqueous colloidal dispersion of a cerium (IV) compound, (ii) destabilizing the resulting dispersion by adding a basic material thereto, and whereby said ceric oxide particulates precipitate thereof, (iii) separating the precipitate thus formed, and (iv) heat treating said separated precipitate at a first temperature sufficient to dry said precipitate, followed by calcining said precipitate at a second temperature sufficient to obtain a desired specific surface.

16. The process as defined by claim 15, said precursor comprising a quaternary ammonium silicate, zirconyl nitrate or sulfate, or a zirconium/fluorine complex.

17. The process as defined by claim 15, said aqueous colloidal dispersion of a cerium (IV) compound comprising a dispersion, in water, of a cerium (IV) compound having the following general formula (I):

$$Ce\,(M)_x\,(OH)_y\,(NO_3)_z \cdot nH_2O \qquad (I)$$

wherein M is an alkali metal or a quaternary ammonium radical, x ranges from 0 to 0.2, z ranges from 0 to 0.7, y is such that y =4 −z +x, and n ranges from 0 to about 20.

18. The process as defined by claim 17, the concentration of said cerium (IV) compound in said colloidal dispersion ranging from 0.1 to 2.0 moles/liter.

19. The process as defined by claim 17, comprising dispersing in water a cerium (IV) compound prepared by hydrolysis in an acidic medium of an aqueous solution of a salt of cerium (IV).

20. The process as defined by claim 15, said basic material having a normality ranging from 5 to 10 N.

21. The process as defined by claim 15, the ultimate dispersion having a pH of greater than 7.

22. The process as defined by claim 21, said pH ranging from 9 to 10.

23. The process as defined by claim 15, comprising adding the base at a rate of from 0.1 to 5 moles of OH⁻ per mole of cerium (IV) per hour.

24. The process as defined by claim 15, comprising drying said precipitate and calcining same at a temperature of from 400° to 1000° C. for from 1 to 24 hours.

25. The process as defined in claim 15, said basic material comprising an aqueous solution of ammonia, sodium or potassium hydroxide, or gaseous ammonia.

26. A catalyst comprising the ceric oxide composition as defined by claim 1.

27. A catalyst comprising a support member having an active catalytic phase deposited thereon, said active phase comprising the ceric oxide composition as defined by claim 1.

* * * * *

UNITED STATES PATENT AND TRADEMARK OFFICE
CERTIFICATE OF CORRECTION

PATENT NO. : 4,940,685

DATED : July 10, 1990

INVENTOR(S) : Guy-Noel Sauvion et al.

It is certified that error appears in the above-identified patent and that said Letters Patent is hereby corrected as shown below:

Column 12, line 23 (Claim 12, line 1), "8" should read --11--.

Column 12, line 25 (Claim 13, line 1), "8" should read --11--.

Signed and Sealed this

First Day of October, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,940,685

DATED : July 10, 1990

INVENTOR(S) : Guy-Noel Sauvion et al.

It is certified that error appears in the above-identified patent and that said Letters Patent is hereby corrected as shown below:

COLUMN 12:

Claim 15, lines 29 and 30, "the composition as defined by Claim 1" should be deleted and the following substituted therefor:

--a ceric oxide-based composition, the specific surface of which remains essentially stable at elevated temperatures, which composition includes a carrier comprising a plurality of solid, porous, finely divided ceric oxide particulates, said ceric oxide particulates of said carrier having intimately dispersed therein an effective amount of at least one oxide of a metallic element A comprising alumins# UNITED STATES PATENT AND TRADEMARK OFFICE
CERTIFICATE OF CORRECTION PATENT NO. : 4,940,685
DATED : July 10, 1990
INVENTOR(S) : Guy-Noel Sauvion et al.

It is certified that error appears in the above-identified patent and that said Letters Patent is hereby corrected as shown below:

num, silicon, zirconium, or thorium, said ceric oxide particulates having been shaped and calcined; wherein the amount of the at least one oxide of said metallic element A comprises from about 1 to about 20% by weight of said ceric oxide particulates and wherein the specific surface area of said composition is greater than the specific surface area of said ceric oxide particulates without said metallic element A,--.

Signed and Sealed this

Second Day of March, 1993

*Attest:*

STEPHEN G. KUNIN

*Attesting Officer*     *Acting Commissioner of Patents and Trademarks*